R. LONG.
CHAIN PUMP.
APPLICATION FILED OCT. 23, 1919. RENEWED NOV. 5, 1921.
1,425,112.
Patented Aug. 8, 1922.
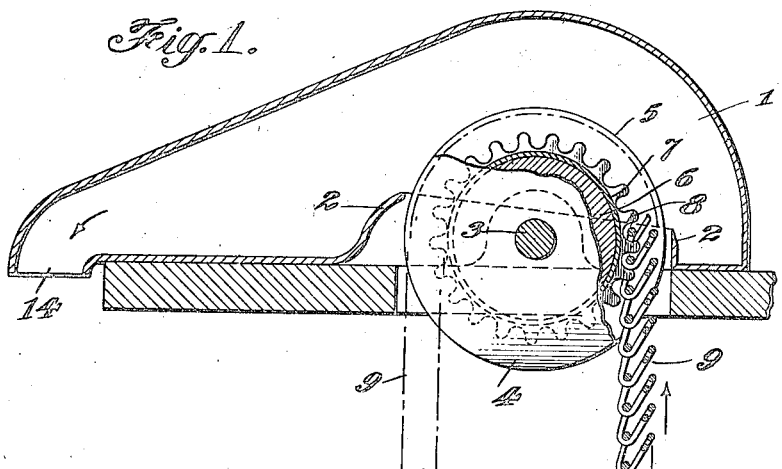
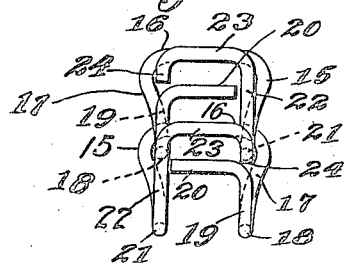
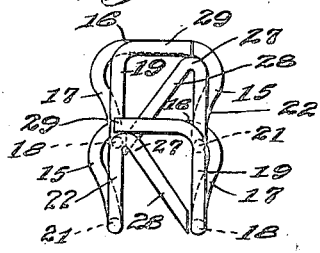
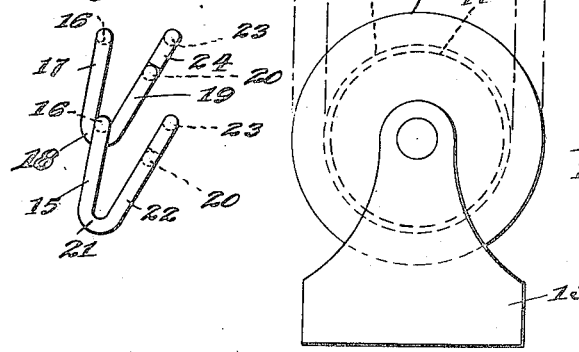
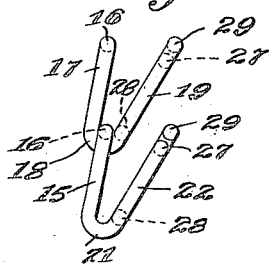
Inventor:
Ramon Long
by John M. Reemer
Attorney

UNITED STATES PATENT OFFICE.

RAMON LONG, OF NEW YORK, N. Y.

CHAIN PUMP.

1,425,112.  Specification of Letters Patent.  Patented Aug. 8, 1922.

Application filed October 23, 1919, Serial No. 332,779. Renewed November 5, 1921. Serial No. 513,212.

*To all whom it may concern:*

Be it known that I, RAMON LONG, a citizen of the United States, and now residing at the city, county, and State of New York, have made a certain new and useful invention relating to Chain Pumps, of which the following is a specification taken in connection with the accompanying drawing, which forms part of the same.

This invention relates especially to chain pumps in which a connected series of ladder type chain links having laterally projecting water carrying portions are arranged to operate over a wheel which may be mounted in a top casing to receive the water there discharged from the chain and which may be carried up by the chain itself through adhesion or surface tension action or carried up within a tube in which the chain may fit loosely.

In the accompanying drawing showing in a somewhat diagrammatic way several illustrative embodiments of this invention, Fig. 1 is a sectional side view of a somewhat diagrammatic arrangement.

Fig. 2 shows in greater detail the chain link construction.

Fig. 3 is a corresponding side view.

Fig. 4 shows another form of chain link construction; and

Fig. 5 is a corresponding side view thereof.

Chain pumps may for many light service requirements such as domestic uses, etc. advantageously comprise chain of the ladder type in which each of the chain links may advantageously though not necessarily be formed of a single piece of round or square sectioned wire of suitable material, such as brass, bronze, Monel metal, galvanized iron, etc. to suit the particular requirements and the material to be handled. For domestic service the ladder type links may be half an inch to an inch wide more or less and may advantageously have a pitch of three-quarters of an inch or more, depending upon the particular capacity desired, and these links 9 may as shown in Fig. 1 be provided with laterally projecting water carrying portions and may operate over one or more wheels or pulleys. The lower end of the chain which is of course preferably a couple of feet below the level of the liquid to be raised may run over a lower wheel or idler pulley, such as 11, which may have the flanges 10 between which the chain runs and may, if desired, have a rubber or other yielding face 12 to be engaged by the connecting portions of the chain links. A weight such as 13, may be pivotally connected to this lower wheel so as to maintain the chain at proper tension and minimize undesirable lateral vibration of the vertical runs of the chain which may be twenty to fifty feet or more in height according to local requirements. The chain may at its upper portion pass around a wheel 4 of any suitable size which may be the driving wheel when the connected shaft 3 running in suitable bearings is rotated manually or from any suitable source of power. This wheel may as indicated have a metal body or hub 6 on which is preferably arranged a facing 7 of rubber or other yielding or fibrous material with which the chain links engage and in case of relatively high lifts definite sprocket teeth, such as 8, may be used to engage the chain links and positively drive them, although this is of course not necessary in all cases. In passing around this upper or driving wheel the chain which may operate at speeds as high as five or six hundred feet per minute tends to discharge the water through centrifugal action and this water is received in a metallic or other top casing 1 formed with water diverting guides 2 around the wheel or chain openings, so that the water is to the greatest possible extent directed toward the discharge opening 14.

Such pump chain may advantageously be formed with ladder type links and as indicated in Fig. 2, for instance, each link may advantageously be formed of a single piece of round or other suitable sectioned wire stock bent up so as to form a connecting cross member or loop 16 extending across the chain link and interlocking with the adjacent link. On each side of this connecting cross member the wire may be bent inward to form the side members 15, 17, provided with the connecting bends 18, 21, which more or less encircle the connecting cross member of the adjacent link. The ends of the wire stock of which each link is formed preferably extend or project laterally to a considerable distance beyond the connecting or body members of the link and these water carrying portions may advantageously extend out at an angle of some twenty to thirty or forty degrees more or less from these connecting body members, as is indicated in Fig. 3, and may comprise one or more cross-pieces so as to more effectively carry up the water through adhesion and surface tension action. A very desirable form of such water carrying portions may comprise several cross-pieces such as the inner cross-piece 20 formed on one of the side pieces or lateral extensions 19 of the corresponding side member. The other extension or side piece 22 of the link may be advantageously arranged at the same angle to the connecting body members and is preferably so spaced that the inner cross-piece 20 substantially contacts therewith. This extension 22 may in many cases be advantageously carried out beyond the cross-piece 20 and then bent over to form an outer cross-piece 23, so that the inner cross-piece is preferably at a lesser distance from this outer cross-piece than it is from the connecting cross member of the link. This outer cross-piece is preferably though not necessarily continued in the form of a connecting bent tip 24 which may extend inward into substantial contact with the inner cross piece 20, so as to promote the film or surface tension action of the chain in carrying water which is still greater of course if close or actual contact exists between these parts as may be readily secured by galvanizing, tinning or otherwise coating the links after they have been bent up into such shape as described. It is advantageous to have such one-piece ladder type wire links reversely directed in alternate links so that as indicated in Fig. 2 the inner cross-pieces, for example, are reversely directed in adjacent links which gives better results because, especially where such tinning or galvanizing has not been resorted to, this minimizes the tendency of the water film to break. The connecting cross members 16 are preferably made with laterally projecting bends of sufficient size so that the water carrying portions of an adjacent link can be manually inserted or removed therefrom without considerable bending or distortion, and this facilitates replacement and insertion of links as in adjusting the length of the chain.

Fig. 4 shows another illustrative form of such ladder type links in which the connecting body portions may be similarly formed while the laterally projecting water carrying portions which may extend out therefrom at a somewhat similar angle as indicated in Fig. 5 may have a somewhat different construction. These water carrying portions may comprise the outer cross-piece 29 formed on the side piece or lateral extension piece 19 of one of the side members 17 and this outer cross-piece may substantially engage or contact with the other extension 22 on the side member 15. This extension 22 is preferably bent sharply at about the point 27 where it cooperates with the outer cross-piece and is then extended diagonally across this water carrying portion of the link so as to come into substantial contact or cooperation with the other lateral extension 19, the end of this inner or diagonal cross-piece being, if desired, bevelled or inclined, as indicated in Fig. 4, to give closer engagement with the extension 19 on the other side. In this case also it is usually advantageous although not of course necessary, to have these diagonal cross-pieces oppositely inclined in some of the links and adjacent links may, if desired, have oppositely inclined diagonal cross-pieces in all cases which seems to give a somewhat higher efficiency and greater water carrying action. This type of link may also in some cases be advantageously galvanized, tinned or soldered so as to give still greater or more effective contact between the cooperating parts of its water carrying portions, although this is not necessary in all cases.

This invention has been described in connection with a number of illustrative embodiments, forms, proportions, parts, elements, arrangements and devices, to the details of which disclosure the invention is not of course to be limited, since what is claimed as new and what is desired to be secured by Letters Patent is set forth in the appended claims.

I claim:

1. The chain pump comprising an upper wheel and a cooperating continuous ladder type chain having one piece wire links formed with connecting body portions and with laterally projecting water carrying portions comprising a plurality of cross-pieces and cooperating substantially contacting side pieces, the corresponding cross-pieces being oppositely directed in alternate links.

2. The chain pump comprising an upper wheel and a cooperating continuous ladder type chain having wire links formed with connecting body portions and with laterally projecting water carrying portions comprising a cross-piece and cooperating substantially contacting side pieces, the cross-pieces being oppositely directed in alternate links.

3. The chain pump comprising driving means and a cooperating continuous ladder type chain having one piece wire links formed with a connecting body portion and with laterally projecting water carrying portions extending at an oblique angle from one end of said body portion and comprising a plurality of cross-pieces and cooperating substantially contacting side pieces.

4. The chain pump comprising driving means and a cooperating continuous chain having wire links formed with a connecting body portion and with laterally projecting water carrying portions extending at an oblique angle from one end of said body portion and comprising a plurality of cross-pieces and cooperating substantially contacting side pieces.

5. The ladder type pump chain comprising interlocked one-piece wire links each having connecting body portions including a cross member and side members formed with connecting bends to partly enclose the connecting cross member of an adjacent link and having a laterally projecting water carrying portion arranged at an angle of between about twenty and forty degrees to said connecting body portions and comprising side pieces which are extensions of said side members and a plurality of cross-pieces each extending across the water portions of the link and substantially engaging the side piece on the other side of the link, an intermediate cross piece extending diagonally across said water carrying portions.

6. The ladder type pump chain comprising interlocked one-piece wire links each having connecting body portions and having a laterally projecting water carrying portion arranged at an angle to said connecting body portions and comprising side pieces and a plurality of cross-pieces each extending across the water carrying portions of the link and approaching the side piece on the other side of the link, an intermediate cross-piece extending obliquely across said water carrying portions.

7. The ladder type pump chain comprising interlocked one-piece round stock wire links each having connecting body portions including a cross member and side members formed with connecting bends to partly enclose the connecting cross member of an adjacent link and having laterally projecting water carrying portions arranged at an angle of between about twenty and forty degrees to said connecting body portions and comprising side pieces which are extensions of said side members and a plurality of cross-pieces extending across said water carrying portions into substantial contact with the side piece on the other side of the link.

8. The ladder type pump chain comprising interlocked one-piece wire links each having connecting body portions including a cross member and side members formed with connecting bends to partly enclose the connecting cross member of an adjacent link and having laterally projecting water carrying portions arranged at angle of about thirty degrees to said connecting body portions and comprising side pieces which are extensions of said side members and a cross-piece extending across said water carrying portions into substantial contact with a member on the other side of the link.

9. The ladder type pump chain comprising interlocked one-piece wire links each having connecting body portions including a cross member and side members and having laterally projecting water carrying portions arranged at an angle to said connecting body portions and comprising extensions of said side members and a cross-piece extending across said water carrying portions into substantial contact with a member on the other side of the link.

RAMON LONG.